(12) United States Patent
Fukumi et al.

(10) Patent No.: US 6,823,687 B2
(45) Date of Patent: Nov. 30, 2004

(54) VEHICLE AIR CONDITIONER WITH VARIABLE DISPLACEMENT COMPRESSOR

(75) Inventors: Shigenobu Fukumi, Chiryu (JP); Hiroyuki Hayashi, Kariya (JP)

(73) Assignee: Denso Corporation, Kariya (JP)

(*) Notice: Subject to any disclaimer, the term of this patent is extended or adjusted under 35 U.S.C. 154(b) by 0 days.

(21) Appl. No.: 10/637,564

(22) Filed: Aug. 11, 2003

(65) Prior Publication Data

US 2004/0050084 A1 Mar. 18, 2004

(30) Foreign Application Priority Data

Sep. 18, 2002 (JP) ........................................ 2002-271305

(51) Int. Cl.$^7$ ................................................ F25B 49/00
(52) U.S. Cl. ................... 62/228.5; 62/196.3; 417/222.2
(58) Field of Search ............................. 62/228.5, 196.3; 417/222.2

(56) References Cited

U.S. PATENT DOCUMENTS

| | | | |
|---|---|---|---|
| 6,334,759 B1 * | 1/2002 | Kaneko et al. | 417/222.2 |
| 6,398,516 B1 * | 6/2002 | Kawaguchi et al. | 417/222.2 |
| 6,435,848 B1 * | 8/2002 | Minami et al. | 417/440 |
| 6,447,258 B2 * | 9/2002 | Ota et al. | 417/222.2 |
| 6,526,771 B2 * | 3/2003 | Takano et al. | 62/228.3 |
| 6,589,019 B2 * | 7/2003 | Terauchi | 417/63 |

FOREIGN PATENT DOCUMENTS

| | | | |
|---|---|---|---|
| EP | 1095804 A2 | * | 5/2001 |
| EP | 1103721 A2 | * | 5/2001 |
| EP | 1106830 A2 | * | 6/2001 |
| JP | A-5-99156 | | 4/1993 |
| JP | A-10-278567 | | 10/1998 |

* cited by examiner

*Primary Examiner*—Harry Tanner
*Assistant Examiner*—Mohammad M. Ali
(74) *Attorney, Agent, or Firm*—Posz & Bethards, PLC

(57) ABSTRACT

In a vehicle air conditioner, a variable displacement compressor has a control valve for continuously changing a discharge capacity of the compressor, and a control unit calculates an electrical value DT to be applied to the control valve based on the following formula of $DT=DT(n-1)+Kp[(En-En-1)+C/(Ti \times En)]$. In this formula, $En=Te-Teo$, $Kp=Kp'/(Ph \times Ph')$, $Ti=Ti'/(Ph \times Ph'')$, C is a sampling cycle, n is a positive number, Kp', Ti', Ph' and Ph" are constants, Ph is a refrigerant pressure at a high pressure side, Te is a detected air temperature at an air outlet of the evaporator, and Teo is a target evaporator air temperature that is calculated based on an outside air temperature Tam. Accordingly, the compressor can be stably controlled in a wide thermal load range.

8 Claims, 2 Drawing Sheets

VEHICLE AIR CONDITIONER WITH VARIABLE DISPLACEMENT COMPRESSOR

CROSS REFERENCE TO RELATED APPLICATION

This application is based on Japanese Patent Application No. 2002-271305 filed on Sep. 18, 2002, the disclosure of which is incorporated herein by reference.

FIELD OF THE INVENTION

The present invention relates to a vehicle air conditioner having a variable displacement compressor. More particularly, the present invention relates to a discharge capacity control of the variable displacement compressor.

BACKGROUND OF THE INVENTION

In a control device of a variable displacement compressor described JP-A-10-278567, a target discharge pressure Pd' of the variable displacement compressor is calculated based on an engine rotational speed Ne and an inside air temperature Tr of a passenger compartment, in order to reduce consumption power. Further, an actual pressure Pd of refrigerant discharged from the variable displacement compressor is controlled using the target discharge pressure Pd'.

On the other hand, in a variable displacement compressor device described in JP-A-5-99156, a driving voltage Vn applied to an idling adjustment valve is calculated in accordance with the following formula (1).

$$Vn=Vn-1+Kp(En-En-1)+(Q/Ti)En \qquad (1)$$

wherein, Kp, Q and Ti are fixed control constants that are set beforehand, En is a deviation between a target rotation speed of the compressor and an actual detected rotation speed of the compressor at the process cycle of "n", and En−1 is a deviation between a target rotation speed of the compressor and an actual detected rotation speed of the compressor at the process cycle of "n−1". However, in this calculation formula (1), the fixed control constants are required to be set suitably around a middle displacement area of the variable displacement compressor. Accordingly, when the variable displacement compressor operates by a small displacement in a case where a thermal load of an air conditioner is small, the temperature of air discharged from an evaporator is readily changed. Therefore, the temperature of air blown into the passenger compartment is difficult to be accurately controlled.

SUMMARY OF THE INVENTION

In view of the above-described problems, it is an object of the present invention to provide a vehicle air conditioner that stably controls a variable displacement compressor in a wide range of thermal load while reducing variation in temperature of air blown from an evaporator.

According to the present invention, in a vehicle air conditioner, a refrigerant cycle includes a variable displacement compressor for compressing refrigerant, a condenser for cooling refrigerant from the variable displacement compressor, a decompression unit for decompressing refrigerant flowing from the condenser, and an evaporator that is disposed in an air conditioning duct to cool air by evaporating refrigerant after being decompressed in the decompression unit. The air conditioner has a load detecting unit for detecting a thermal load in the refrigerant cycle (e.g., evaporator), and a control unit for controlling a discharge capacity of the variable displacement compressor. The variable displacement compressor includes a control valve that continuously changes the discharge capacity of the variable displacement compressor. In the vehicle air conditioner, the control unit calculates an electrical value to be applied to the control valve based on a predetermined calculation formula having at least a control constant, and supplies the electrical value to the control valve so as to control the discharge capacity of the variable displacement compressor. In addition, the control unit changes the control constant in the predetermined calculation formula in accordance with the thermal load. Accordingly, it is possible to stably control the operation of the refrigerant cycle in a wide thermal load range between a high load area and a low load area. Therefore, the variation in air temperature at the air outlet of the evaporator can be made smaller.

Preferably, the load detecting unit includes refrigerant state detecting means for detecting one of a pressure and a flow amount of high-pressure refrigerant before being decompressed in the decompression unit, and the control unit changes the control constant in the predetermined calculation formula, in accordance with the one of the pressure and the flow amount of the high-pressure refrigerant. Further, the control unit calculates a target evaporator air temperature based on the outside air temperature, and calculates the electrical value by using a difference between the evaporator air temperature detected by the evaporator temperature detecting means and the target evaporator air temperature. Therefore, the air temperature at the air outlet of the evaporator can quickly approach to the target evaporator air temperature. For example, the thermal load is at least one of an air temperature at an air outlet of the evaporator, a temperature difference between a target air temperature to be blown into the passenger compartment and an inside temperature of the passenger compartment, a correction value of the air temperature at the air outlet of the evaporator, which is corrected by the outside air temperature, and a correction value of the temperature difference between the target air temperature and the inside temperature, which is corrected by the outside air temperature.

Specifically, the predetermined calculation formula is DT=DT(n−1)+Kp[(En−En−1)+C/(Ti×En)]. In this formula, En=Te−Teo, Kp=Kp'/(Ph×Ph'), Ti=Ti'/(Ph×Ph"), C is a sampling cycle, n is a positive number, Te is the detected air temperature at the air outlet of the evaporator, Teo is the evaporator target air temperature, Ph is the refrigerant pressure at the high pressure side, and Kp', Ti', Ph' and Ph" are constants. Therefore, the variable displacement compressor can be stably controlled in the wide thermal-load range, while the variation in the air temperature at the air outlet of the evaporator can be made small.

BRIEF DESCRIPTION OF THE DRAWINGS

Other objects, features and advantages of the present invention will become more apparent from the following detailed description made with reference to the accompanying drawings, in which.

DETAILED DESCRIPTION OF THE PREFERRED EMBODIMENT

A preferred embodiment of the present invention will be described with reference to FIGS. 1 and 2. In this embodiment, the present invention is typically applied to a vehicle air conditioner A shown in FIG. 1.

Figure 1:
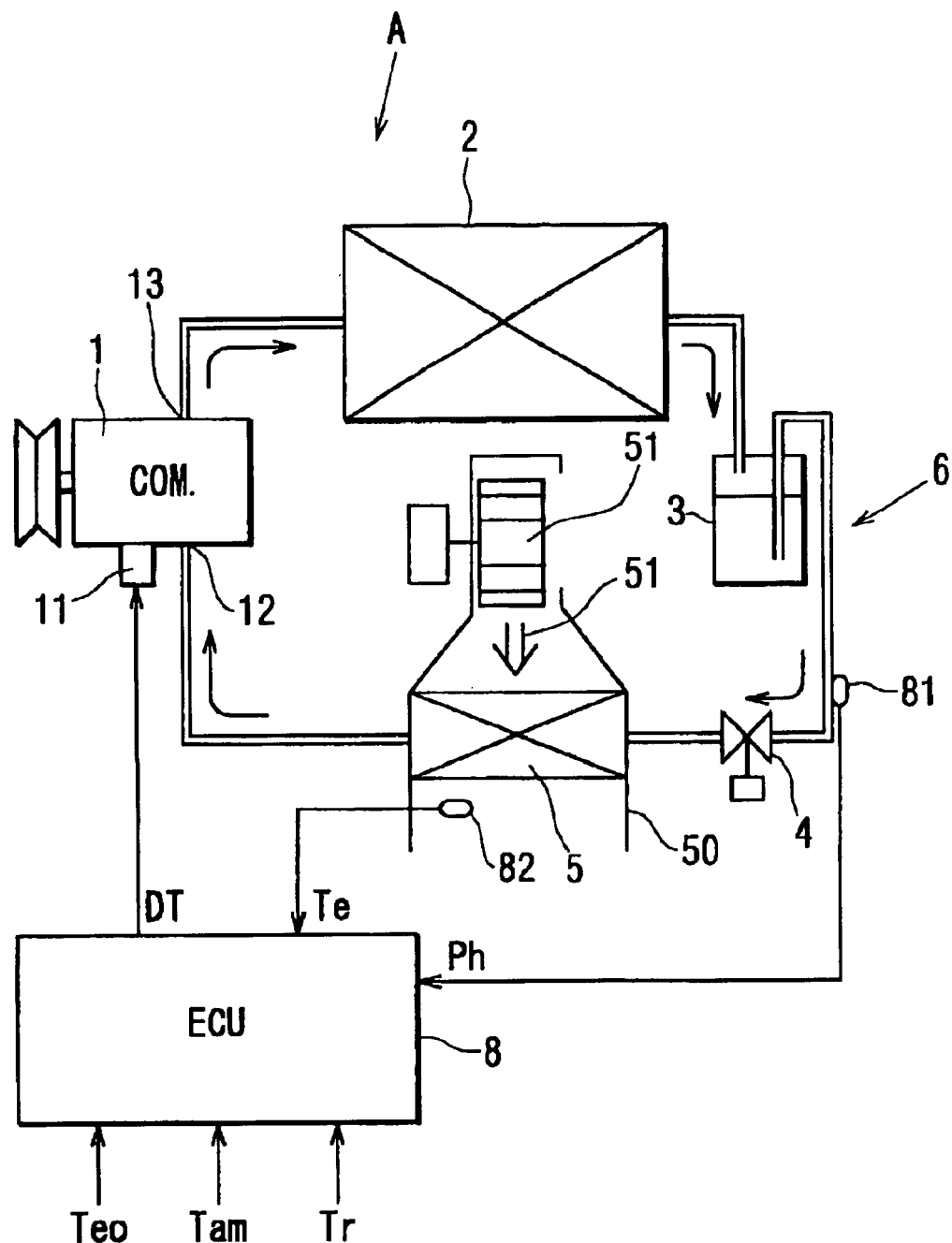
FIG. 1 is a schematic diagram showing a vehicle air conditioner with a variable displacement compressor according to a preferred embodiment of the present invention.
Figure 2:
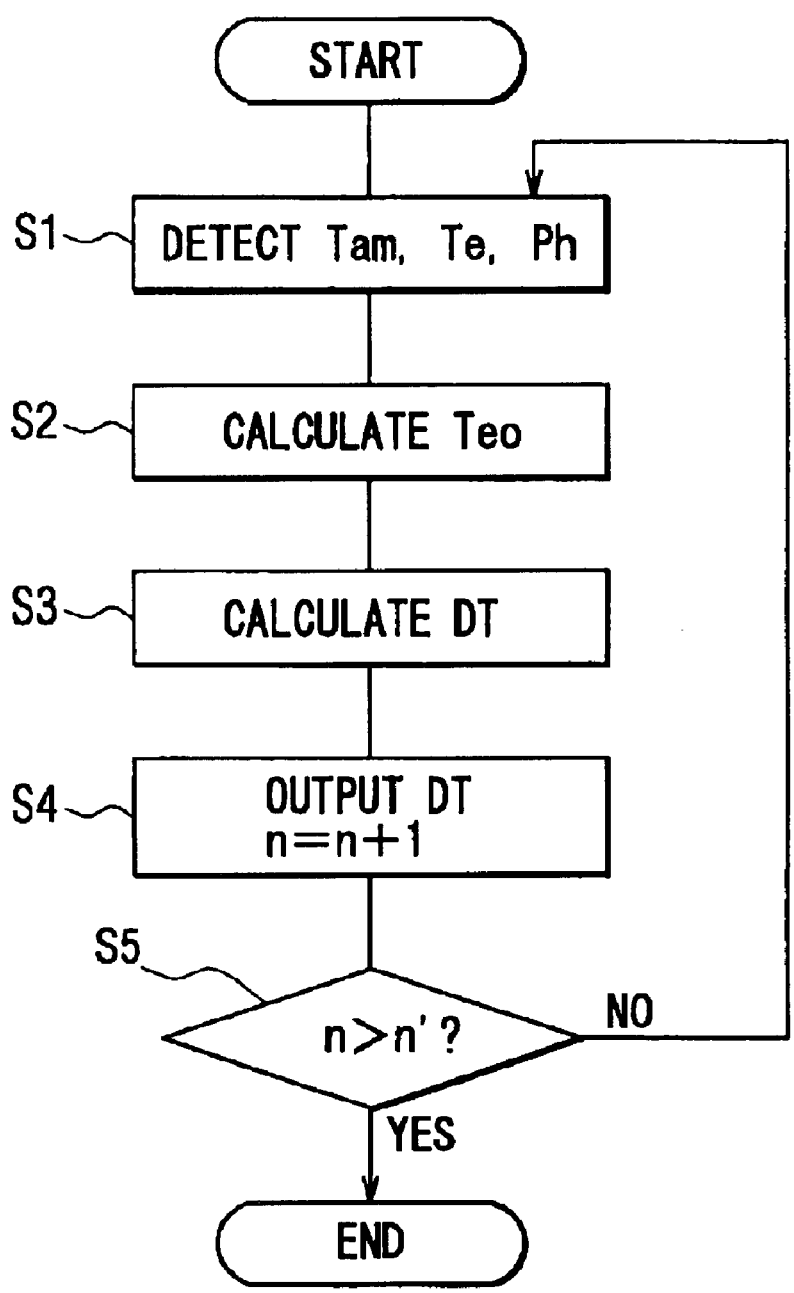
FIG. 2 is a flow diagram showing a control operation of the variable displacement compressor in the vehicle air conditioner according to the embodiment.

As shown in FIG. 1, a refrigerant cycle 6 of the vehicle air conditioner A includes a variable displacement compressor 1 for compressing refrigerant, a condenser 2 for cooling and condensing refrigerant discharged from a discharge port 13 of the compressor 1, a gas-liquid separator 3 for separating refrigerant flowing from the condenser 2 into gas refrigerant and liquid refrigerant, an expansion valve 4 and an evaporator 5. Generally, refrigerant flowing into the condenser 2 is heat-exchanged with outside air blown by a fan, to be cooled and condensed. Liquid refrigerant from the gas-liquid separator 3 is decompressed in the expansion valve 4, and is evaporated in the evaporator 5 by absorbing heat from air passing through the evaporator 5. Therefore, air passing through the evaporator 5 is cooled. The components 1–5 are connected by using refrigerant pipes so that the refrigerant cycle 6 is constructed.

The variable displacement compressor 1 is driven by an electrical motor or is driven by a vehicle engine through a belt and a clutch. A displacement (i.e., discharge capacity) of the variable displacement compressor 1 can be continuously changed in accordance with an electrical value DT applied to a control valve 11. Low-temperature and low-pressure gas refrigerant evaporated in the evaporator 5 is sucked into a suction port 12 of the variable displacement compressor 1.

The vehicle air conditioner A further includes an air conditioning duct 50 for defining an air passage through which air flows into a passenger compartment. The evaporator 5 is disposed in the air conditioning duct 50 for cooling air. A blower 51 is disposed in the air conditioning duct 50 so that air 52 blown by the blower 51 is cooled by the evaporator 5.

A refrigerant pressure sensor 81 for detecting a pressure Ph of high-pressure refrigerant before being decompressed is disposed in a refrigerant pipe between the gas-liquid separator 3 and the expansion valve 4. The detection signal of the high-pressure refrigerant pressure Ph is input to a control unit 8 (ECU) from the refrigerant pressure sensor 81. An air temperature sensor 82 is disposed in the air conditioning duct 50 at an air outlet side of the evaporator 5 to detect an air temperature Te at the air outlet of the evaporator 5. Further, an outside temperature sensor (not shown) is disposed to detect temperature Tam (outside air temperature) of air outside the passenger compartment, and an inside temperature sensor (not shown) is disposed to detect temperature Tr (inside air temperature) of air inside the passenger compartment. The detection signals of the air temperature sensor 82, the outside temperature sensor, the inside temperature sensor and the like are also input into the control unit 8.

Then, the control unit 8 calculates the electrical value DT (e.g., electrical current value, electrical voltage value) in accordance with the following formula (2) by using the detection values of the sensors.

$$DT = DT(n-1) + Kp[(En - En-1) + C/(Ti \times En)] \quad (2)$$

Wherein, $En = Te - Teo$, $Kp = Kp'/(Ph \times Ph')$, $Ti = Ti'/(Ph \times Ph'')$, C is a sampling cycle, n is a positive number, and $Kp'$, $Ti'$, $Ph'$ and $Ph''$ are constants. Further, Teo is a target evaporator air temperature, Te is the air temperature detected by the air temperature sensor 82, and Ph is the pressure of the high-pressure side refrigerant detected by the refrigerant pressure sensor 81. Hear, the target evaporator air temperature Teo can be calculated based on the outside air temperature Tam.

Then, electrical power is supplied to the control valve 11 of the variable displacement compressor 1 by the electrical value DT.

Next, control operation of a microcomputer (not shown) of the control unit 8 will be explained with reference to the flow diagram shown in FIG. 2, when a cooling operation is performed in the vehicle air conditioner A. First, at step S1, the outside air temperature Tam is detected by the outside temperature sensor, the evaporator air temperature Te is detected by the air temperature sensor 82, and the refrigerant pressure Ph at the high-pressure side is detected by the refrigerant pressure sensor 81. At step S2, the target evaporator air temperature Teo is calculated in accordance with a map (not shown) based on the detected outside air temperature Tam. Next, at step S3, the electrical value DT to be applied to the control value 11 is calculated in accordance with the above-described formula (2) by using the detected refrigerant pressure Ph, the detected evaporator air, temperature Te and the calculated target evaporator air temperature Teo. Then, at step S4, the electrical power is applied to the control valve 11 of the variable compressor 1 by the calculated electrical value DT, and the control process number "n" is set at (n=n+1). When the control process number "n" is larger than a predetermined number n' at step S5, the control program is ended. Alternatively, when a predetermined time is elapsed or when the operation of the variable displacement compressor 1 is stopped, the control program shown in FIG. 2 is ended.

According to the present invention, the control unit 8 of the vehicle air conditioner A calculates the target evaporator air temperature Teo based on the outside air temperature Tam, and calculates the electrical value DT applied to the control valve 11 based on the above-described formula (2). In the calculation of DT using the formula (2), the Kp and Ti (constant values) are changed in accordance with the detected refrigerant pressure Ph that relates to the thermal load of the refrigerant cycle 6. Thus, the evaporator air temperature Te can quickly approach to the target evaporator air temperature Teo, while the variation in the air temperature at the air outlet of the evaporator 5 can be made small. Accordingly, air conditioning feeling given to a passenger in the passenger compartment can be improved.

Generally, the thermal load is high when the evaporator air temperature Te or the outside air temperature Tam is high or when the refrigerant pressure Ph or a refrigerant flow amount at the high-pressure side of the refrigerant cycle 6 is high. In this case, the electrical value DT is set at a large value, so that the variable displacement compressor 1 operates by a large discharge capacity. Further, the thermal load is low when the evaporator air temperature Te or the outside air temperature Tam is low or when the refrigerant pressure Ph or the refrigerant flow amount at the high-pressure side of the refrigerant cycle is small. In this case, the electrical value DT is set at a small value, so that the variable displacement compressor 1 operates by a small discharge capacity.

That is, the Kp and the Ti in the formula (2) can be changed in accordance with a physical value relative to the thermal load of the refrigerant cycle 6, such as the outside air temperature Tam, the evaporator air temperature Te and the refrigerant flow amount at the high-pressure side. Even in this case, the control constants Kp, Ti can be changed in accordance with the thermal load, and the operation control of the refrigerant cycle 6 can be stably performed in a wide load area. Further, the variation in the air temperature at the outlet of the evaporator 5 can be effectively reduced.

Although the present invention has been fully described in connection with the preferred embodiment thereof with reference to the accompanying drawings, it is to be noted that various changes and modifications will become apparent to those skilled in the art.

For example, in the above-described embodiment, the calculation formula (2) of the electrical value DT can be suitably changed. That is, the control constants Kp and Ti can be set to be changed in accordance with the thermal load, such that the electrical value DT becomes larger as the thermal load becomes larger, and the electrical value DT becomes smaller as the thermal load becomes smaller.

Further, the thermal load can be detected by a thermal load detecting unit such as sensors. For example, the thermal load can be the evaporator air temperature Te, a temperature difference between a target air temperature TAO to be blown into the passenger compartment and the inside air temperature Tr, a corrected value of the evaporator air temperature Te by the outside air temperature Tam, or a corrected value of the target air temperature TAO by the outside air temperature.

In addition, in the above-described calculation formula (2), the refrigerant flow amount at the high pressure side can be used instead of the refrigerant pressure Ph of the high pressure side.

Such changes and modifications are to be understood as being within the scope of the present invention as defined by the appended claims.

What is claimed is:

1. An air conditioner for a vehicle, comprising:
   an air conditioning duct for defining an air passage through which air flows into a passenger compartment;
   a refrigerant cycle including a variable displacement compressor for compressing refrigerant, a condenser for cooling refrigerant from the variable displacement compressor, a decompression unit for decompressing refrigerant flowing from the condenser, and an evaporator that is disposed in the air conditioning duct to cool air by evaporating refrigerant after being decompressed in the decompression unit;
   a load detecting unit for detecting a thermal load in the refrigerant cycle; and
   a control unit for controlling a discharge capacity of the variable displacement compressor, wherein:
   the variable displacement compressor includes a control valve that continuously changes the discharge capacity of the variable displacement compressor;
   the control unit calculates an electrical value to be applied to the control valve based on a predetermined calculation formula having at least a control constant, and supplies the electrical value to the control valve so as to control the discharge capacity of the variable displacement compressor; and
   the control unit changes the control constant in the predetermined calculation formula in accordance with the thermal load.

2. The air conditioner according to claim 1, wherein the variable displacement compressor is driven by one of an engine and an electrical motor mounted in the vehicle.

3. The air conditioner according to claim 1, wherein:
   the load detecting unit includes refrigerant state detecting means for detecting one of a pressure and a flow amount of high-pressure refrigerant before being decompressed in the decompression unit; and
   the control unit changes the control constant in the predetermined calculation formula, in accordance with the one of the pressure and the flow amount of the high-pressure refrigerant.

4. The air conditioner according to claim 3, further comprising:
   evaporator temperature detecting means for detecting an evaporator air temperature at an air outlet of the evaporator; and
   outside temperature detecting means for detecting an outside air temperature outside the passenger compartment, wherein:
   the control unit calculates a target evaporator air temperature based on the outside air temperature, and calculates the electrical value by using a difference between the evaporator air temperature detected by the evaporator temperature detecting means and the target evaporator air temperature.

5. The air conditioner according to claim 1, wherein the thermal load is at least one of an air temperature at an air outlet of the evaporator, a temperature difference between a target air temperature to be blown into the passenger compartment and an inside temperature of the passenger compartment, a correction value of the air temperature at the air outlet of the evaporator, which is corrected by an outside air temperature, and a correction value of the temperature difference between the target air temperature and the inside temperature, which is corrected by the outside air temperature.

6. The air conditioner according to claim 1, wherein the control unit changes the control constant in the predetermined calculation formula in accordance with the thermal load, such that the electrical value becomes larger as the thermal load becomes larger, and the electrical value becomes smaller as the thermal load becomes smaller.

7. An air conditioner for a vehicle, comprising:
   an air conditioning duct for defining an air passage through which air flows into a passenger compartment;
   a refrigerant cycle including a variable displacement compressor for compressing refrigerant, a condenser for cooling refrigerant from the variable displacement compressor, a decompression unit for decompressing refrigerant flowing from the condenser, and an evaporator that is disposed in the air conditioning duct to cool air by evaporating refrigerant after being decompressed in the decompression unit;
   evaporator temperature detecting means for detecting an evaporator air temperature Te at an air outlet of the evaporator;
   outside temperature detecting means for detecting an outside air temperature Tam outside the passenger compartment;
   refrigerant pressure detecting means for detecting a refrigerant pressure Ph at the high pressure side before being decompressed by the decompression unit in the refrigerant cycle; and
   a control unit for controlling a discharge capacity of the variable displacement compressor, wherein:
   the variable displacement compressor includes a control valve that continuously changes the discharge capacity of the variable displacement compressor; and
   the control unit calculates an electrical value to be applied to the control valve based on the following calculation formula, and supplies the electrical value to the control valve so as to control the discharge capacity of the variable displacement compressor, $$DT=DT(n-1)+Kp[(En-En-1)+C/(Ti \times En)]$$

wherein, $En=Te-Teo$, $Kp=Kp'/(Ph \times Ph')$, $Ti=Ti'/(Ph \times Ph'')$, C is a sampling cycle, n is a positive number, and $Kp'$, $Ti'$, $Ph'$ and $Ph''$ are constants, and wherein Teo is a target evaporator air temperature that is calculated by the control unit based on the outside air temperature Tam.

8. The air conditioner according to claim 7, wherein the variable displacement compressor is driven by one of an engine and an electrical motor mounted in the vehicle.

* * * * *